Patented Sept. 24, 1929

1,728,940

UNITED STATES PATENT OFFICE

JOHN WESLEY MARDEN, OF EAST ORANGE, NEW JERSEY, ASSIGNOR TO WESTING-HOUSE LAMP COMPANY, A CORPORATION OF PENNSYLVANIA

METHOD FOR PRODUCING URANIUM AND URANIUM-ZINC ALLOYS

No Drawing.  Application filed March 1, 1926.  Serial No. 91,620.

This invention relates to the preparation of the rare metals such as uranium, thorium, and the like, in such condition that they may be readily handled in the air without detrimental oxidation, and more particularly, to the preparation of a stable form of uranium metal powder.

The metals of the uranium-thorium group, frequently referred to as the rare metals, have a very strong affinity for oxygen so that these metals, when prepared in the powder form, are difficult to obtain in the pure coherent form due to the fact that the powder, because of its fineness, may readily combine with oxygen and the like to form objectionable compounds.

I have discovered that rare metal powders may be obtained in such condition that they may be readily handled in the air without danger of any detrimental oxidation or other contamination occurring. This may be accomplished according to my invention by the production of a coarse grade of powder of the rare metal. Owing to the smaller surface area in such coarse material, there is less danger of oxidation. I also simultaneously form with the rare metal powder, an alloy which is stable and which at the same time, may be readily handled without fear of contamination and which is susceptible to being pressed into coherent form.

Referring to the process of preparing the metal in the coarse powdered condition, reference may be had to copending application Serial No. 618,544, filed February 12, 1923, and entitled Method of preparing refractory metals, assigned to the same assignee as the present invention.

According to this method, a rare metal compound may be mixed with a reducing agent such as an alkaline earth metal, preferably calcium and a fluxing agent such as a halide of an alkaline earth metal, preferably calcium chloride. A mixture of these ingredients in the proper proportions is placed within an iron bomb which may be lined with an insulating material such as calcium oxide and the like. This bomb after being hermetically sealed, may have the gaseous contents removed by evacuation or by taking up the residual atmosphere by means of a chemical agent such as calcium magnesium and the like. The bomb is heated to reaction temperature and after the reaction is complete, the products of the reaction are permitted to cool after which they are removed and the rare metal powder extracted by removing the salts of the reaction and other products except the rare metal by suitable solvents such as water, acid and the like.

The grade of powder produced by means of this process is very satisfactory and stable. In order to obtain a still coarser grade of powder by means of this process, I have found that if a chemical substance is added to the charge which will, when reduced, produce sufficient heat to raise the temperature of the reaction, a much coarser grade of powder may be obtained. Therefore, in practicing the process referred to in the copending application identified above, if a rare metal such as uranium which is very active, is desired to be produced, I add to the charge a suitable amount of a chemical compound such as zinc chloride together with sufficient calcium chippings to effect the reduction thereof. During the reaction between the calcium and the zinc chloride, because of the low heat of formation of the latter, sufficient heat is liberated to raise the temperature during the reaction so as to obtain a coarse grade of powder. If desirable, the quantity of zinc chloride may be increased to such an extent or a suitable proportion of some other substance which will serve to act in the same capacity as zinc chloride may be added to cause the uranium to be produced in a fused mass.

The reaction in the case of uranium is as follows:

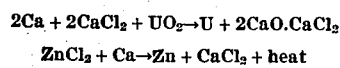

$$ZnCl_2 + Ca \rightarrow Zn + CaCl_2 + \text{heat}$$

If the temperature of the reaction is not too high, a rare metal alloy with zinc may be obtained. This alloy in the case of uranium, consists of bright shining crystals ranging in size from those that pass a 40 mesh sieve to finer particles which pass a 200 mesh sieve. The powder is light grey in color and unlike uranium metal, if not coarse, may be readily handled in the air without fear of oxidation. This alloy may be pressed into shape without the use of any combining material, and when exposed to the air does not become heated, but remains bright for a considerable length of time, thus indicating its stability.

In order to recover the rare metal from the alloy, the powder may be pressed into suitable form and heat treated in a vacuum either by the passage of current directly through the same or by high frequency induction heating. This heat treatment is conducted until the zinc is distilled away. It will be found that during the heat treatment, the alloy shrinks considerably and after the removal of the zinc therefrom, the rare metal, if uranium, is obtained in a white coherent condition. During the heat treatment, the alloy does not appear to melt.

In practicing the foregoing processes it may be desirable to use an alundum or aluminum oxide crucible or lining for the bomb so as to reduce to a minimum, the loss of heat by radiation.

From the foregoing it will be observed that the methods described, will, when practiced, result in the production of a rare metal in such form that it may be readily handled in the air without danger of any serious or detrimental contamination. The method is especially suitable for such rare metals as are extremely active and which readily combine with oxygen and the like to form compounds which are difficult of removal by volatilization or otherwise.

Modifications of the foregoing processes may occur to those skilled in the art but such as fall within the scope of the appended claims are contemplated by me as forming part of my invention.

What is claimed is:

1. The method of forming uranium in stable form which comprises reducing uranium oxide by means of calcium in the presence of calcium chloride and simultaneously reducing zinc chloride therewith.

2. The method of producing uranium in stable form which comprises forming a mixture of uranium oxide, calcium, calcium chloride, zinc chloride and heating the mixture in a closed bomb to reaction temperature.

3. The method of producing highly reactive metal powders which comprises reducing a compound of said metal in an hermetically sealed container with an alkaline earth metal in the presence of a halogen compound of said alkaline earth metal and in addition thereto adding a proportion of a metal compound having a relative low heat of formation, the metal component of which is alloyable with the refractory metal to form an alloy substantially inert with respect to atmospheric gases, and which alloy may subsequently be decomposed by vaporizing the added metal constituent by heating in vacuo.

4. The method of producing uranium metal powder which comprises reducing a compound of uranium with calcium in an hermetically sealed container, in the presence of a flux comprised of a halogen compound of calcium, and adding to the charge a proportion of zinc chloride.

5. The method of producing uranium which comprises simultaneously reducing a compound of uranium admixed with a proportion of a zinc compound with calcium in an hermetically sealed container, in the presence of calcium chloride, recovering the metal powder product and thereafter compacting and recovering the uranium therefrom by distilling the zinc content therefrom in an inert environment.

6. The method of producing uranium metal which comprises reducing simultaneously in a sealed container a uranium compound admixed with a proportion of a zinc compound with calcium in the presence of calcium chloride, recovering the metal powder product in any suitable manner and thereafter heating the metal powder in a high vacuo to vaporize the zinc component thereof and to sinter the uranium.

7. As an article of manufacture, uranium metal powder alloyed with an appreciable amount of zinc substantially stable and inert with respect to atmospheric gases.

8. As an article of manufacture a uranium-zinc alloy in powder form.

In testimony whereof, I have hereunto subscribed my name this 27th day of February, 1926.

JOHN WESLEY MARDEN.